US009230007B2

(12) United States Patent
Guay et al.

(10) Patent No.: US 9,230,007 B2
(45) Date of Patent: Jan. 5, 2016

(54) PRESERVING SETS OF INFORMATION IN ROLLUP TABLES

(75) Inventors: Todd P. Guay, Nashua, NH (US); Dimitris Nakos, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1946 days.

(21) Appl. No.: 10/678,800

(22) Filed: Oct. 3, 2003

(65) Prior Publication Data

US 2005/0076065 A1  Apr. 7, 2005

(51) Int. Cl.
*G06F 17/30* (2006.01)
*G06F 11/34* (2006.01)

(52) U.S. Cl.
CPC ...... *G06F 17/30595* (2013.01); *G06F 11/3447* (2013.01); *G06F 17/30368* (2013.01); *G06F 11/3495* (2013.01); *G06F 17/30412* (2013.01)

(58) Field of Classification Search
CPC .................. G06F 17/30595; G06F 17/30412
USPC .................. 707/1–10, 100–104.1, 200–205, 707/660–675
See application file for complete search history.

(56) References Cited

U.S. PATENT DOCUMENTS

| 5,537,589 | A * | 7/1996 | Dalal ..................................... 1/1 |
| 6,385,604 | B1 * | 5/2002 | Bakalash et al. .................. 707/3 |
| 6,993,529 | B1 * | 1/2006 | Basko et al. ................... 707/100 |
| 2002/0029207 | A1 * | 3/2002 | Bakalash et al. .................. 707/1 |
| 2002/0099691 | A1 * | 7/2002 | Lore et al. ......................... 707/2 |
| 2002/0158765 | A1 * | 10/2002 | Pape et al. ................... 340/573.3 |
| 2004/0034616 | A1 * | 2/2004 | Witkowski et al. ............... 707/1 |
| 2004/0120250 | A1 * | 6/2004 | Langevin et al. ............. 370/216 |

OTHER PUBLICATIONS

"Managing the Complete Oracle Environment with Oracle Enterprise Manager 10g Grid Congrol" an Oracle White Paper, Aug. 2003, p. 12-26.

* cited by examiner

*Primary Examiner* — Usmaan Saeed
*Assistant Examiner* — Navneet K Gmahl
(74) *Attorney, Agent, or Firm* — Vista IP Law Group, LLP

(57) ABSTRACT

Techniques for making aggregated entries in a database table which aggregate information from other entries in tables in the database system. The techniques permit the aggregated entries to contain not only metric values aggregated from the other entries by techniques such as averaging in which the individual values are lost, but also sets of individual values from the other entries. One area of application for the techniques is the roll up tables used in the management systems for database management systems to reduce the size of historic information about events that have occurred in the database management system. Each roll up entry in a roll up table is an aggregated entry that contains information about some number of events. A roll up entry that uses the techniques contains a representation of a set whose values are the occurrence times of the events that are represented by the rollup record. Among the techniques that can be used to represent the set of occurrence times are a comma list of the occurrence times and a bit map which has a bit for each second in a day. Roll up entries that contain such representations of sets of occurrence times may be analyzed to determine whether occurrences of events are related, and if they are, the fact of the relationship can be used to design filters that can be applied in the roll up process, in error reporting, and in the analysis of the roll up tables.

48 Claims, 5 Drawing Sheets page hit table 201 page hit rollup table for period X 211

| page URL 213 | set of hit times 303 | No. of hits 215 |
|---|---|---|
| A | set value x | m |
| D | set value y | n | page hit roll up table with hit times 301

5,70, . . . 28795,28796,28797,28801,28805,28806 . . .

comma list set data item 305 bit set data item 307

| InstanceId | AlertState | AlertCount | AlertOccurrences | RollupTime | RollupInterval | MessageId |
|---|---|---|---|---|---|---|
| 1 | Warning | 1 | 3:121:5 | 01-MAY-2003 00:00:00 | Daily | 68 |
| 1 | Warning | 1 | 3:127:65 | 05-MAY-2003 00:00:00 | Daily | 68 |

Daily rollup entries 501
501(i)
501(j)

| InstanceId | AlertState | AlertCount | AlertOccurrences | RollupTime | RollupInterval | MessageId |
|---|---|---|---|---|---|---|
| 1 | Warning | 2 | 3:121:5,3:127:65 | 01-MAY-2003 00:00:00 | Monthly | 68 | monthly roll up entry 517(k)

set value 519

Fig. 5

PRESERVING SETS OF INFORMATION IN ROLLUP TABLES

CROSS REFERENCE TO RELATED APPLICATIONS

BACKGROUND OF THE INVENTION

1. Field of the Invention

The invention relates generally to reducing the size of stored data and more specifically to reducing the size of information used to manage a data processing system.

2. Description of Related Art: FIGS. 1 and 2

Nothing is easier in a modern data processing system than storing data, and nothing is cheaper than the storage media needed to store it. Yet one of the chief consequences of this happy situation is that system managers are forever short of storage for their data. No one likes to actually throw data out, so many techniques have been developed to reduce the size of the data. Size reduction techniques fall into two classes: lossless techniques, in which the size of the data is reduced but no information is lost, and lossy techniques, in which the size of the data is reduced and some of the information is lost, but the interesting information is saved. Both techniques have their advantages and disadvantages. Lossless techniques save all the information but reduce its size by encoding the information. The need to preserve all the information limits the amount of reduction that can be achieved and the need first to encode the information, then to decode the information whenever it is read and then to decode and encode it whenever it is altered greatly increases the overhead of working with such information. Far greater size reductions are possible with lossy techniques than with lossless techniques and encoding can often be avoided, but lossy techniques are based on saving interesting information and therefore tend to be application-dependent, since it is the application that defines what is interesting.

An example of lossy size reduction techniques is the roll up tables that are used in database management systems to reduce the amount of system management information that must be stored. By reducing the amount of information that must be stored, roll up tables also make management of the information easier. For example, queries execute much faster on the roll up tables than they would have on the equivalent non-rolled up tables. FIG. 1 is an overview of a modern DBMS system management system 101, the Oracle® Enterprise Manager, manufactured by Oracle Corporation, Redwood City, Calif. System management system 101 includes a management service 113 that resides on a management server 111, a computer system that includes an Oracle DBMS and network connections to a group of monitored targets 103 (i..n). Typically, monitored targets 103 are Oracle DBMS systems and Oracle servers which receive requests for information contained in the Oracle DBMSs from users of the World Wide Web.

Each monitored target 103(i) includes a management agent 105 which is an agent for management service 113. Agent 105 continually monitors its target 103(i) as specified by commands that agent 105 receives from management service 113 and sends messages about the results of its monitoring to management service 113. The occurrences in target 103(i) that agent 105 monitors are termed in the following events. An event may be a hit on a Web page that is stored on target 013(i), it may be a system condition that has crossed a threshold, such as the amount of disk space available, or any other occurrence that is of interest to management service 113. Commands from service 113 and messages from agent 105 are communicated using Internet protocols across a network connecting management service 113 and target 103(i). Management service 113 may respond to a message by storing its contents in tables in management repository 115, an Oracle DBMS. Management service 113 may of course also take immediate action in response to a message. The immediate action may be an automatic response to the message or it may be providing a message to central console 121, which a database administrator (DBA) uses to communicate with management service 113. The DBA may then use console 121 to enter commands to management service 113 to deal with the situation noted by management service 113. The DBA may also use console 121 to investigate the current and historical state of the monitored targets 103 and to reconfigure the monitored targets.

If there is any large number of monitored targets 103, the agents return an enormous amount of information to management service 113 and most of the returned information ends up in management repository 115. Consequently, management repository 115 quickly fills up. To reduce the amount of space required by the returned information in repository 115, management service 113 periodically aggregates the older returned information to reduce its size. To aggregate the information, management service 103 rolls up the older returned information to produce rolled up information which is much smaller than the information it was made from and then replaces the older information with the rolled up information. Thus, in FIG. 1, management repository 115 includes current non-rolled up information 117 and less current rolled up information 119.

Since the rolled up information is on the one hand historical but on the other hand needs to be easily accessible to central console 121, management service 103 uses lossy techniques to do the roll up. FIG. 2 gives a simplified example. The events being monitored in the example are hits on Web pages. For purposes of the example, management repository 215 is taken to include a page hit table 201 which has entries that record accesses by users on the World Wide Web to Web pages provided by monitored targets 103. There is a hit entry 209 for each hit on a page in a monitored target 103. Each entry includes three items of data: the URL (universal resource locator) for the page, a time/date stamp 205 which indicates when the hit occurred, and the source Internet address 207 of the entity that made the hit.

Clearly, page hit table 201 will grow very rapidly. Management service consequently periodically rolls up table 201 to produce a page hit roll up table 211 for a period X. Roll up table 211 contains only two columns: one, 213, for page URLs and one, 215, that indicates the number of hits received on the page during the period X. There is only one entry for each of the page URLs in table 211, and the value of field 215 for the entry is the number of hits experienced by the page in the period X. As will be immediately apparent from the foregoing, management service 113 makes table 211 from table 201 by making a single entry 217 in table 211 for each of the URLs that is present in table 201, counting the number of entries for each URL in table 201 for the period X, and placing the result of the count in no. of hits field 215. As will also be immediately apparent, table 211 is far, far smaller than table 201. In the following, tables like page hit roll up table 211 will be called aggregation tables and their entries aggregated entries, since each entry in table 211 may aggregate information from many entries in table 201. Further, values such as number of hits 215 which are made by combining a set of values such that the individual values in the set are lost will be termed herein metric values. Other examples of such metric values are averages, maxima, minima, modes, and medians.

The meaning of a metric value of course depends on the kind of event. For example, if the event indicates that a condition to which the DBA must respond has arisen, the metric value may indicate the time between the time at which the event occurred and the time at which the DBA responded, and the aggregated metric value may be the average response time.

Of course, table 211 may itself be rolled up. For example, if the period X is one day and there is thus a roll up table 211 for each day, a weekly roll up table may be made from seven daily tables 111. Again, there would be one entry for each URL upon which there was a hit during the week, and no. of hits 215 would contain the number of hits for the week. The week tables may be rolled up into month tables, the month tables into year tables, and so on. The creation of any roll up entry may be regarded as a roll up event at a roll up level n, with the entry created by the roll up being a roll up event entry for level n and the roll up at level n+1 rolling up the roll up event entries for level n.

Aggregation tables are challenging to design. The challenge is to reduce the size of the information in the aggregation table as much as possible while reducing the usefulness of the information contained in the table as little as possible. Table 211 illustrates the difficulty. In page hit table 201, the time at which each hit occurred is recorded in time/date field 205; this information is lost in table 211; thus, though table 211 can tell the DBA how many times a page was hit in the period X, it cannot tell the DBA anything about the temporal distribution of hits over the period X. This pattern information may, however, be exactly what the DBA needs to correctly distribute copies of the page among monitored targets 103. What is needed if rollup table 211 is to provide useful information about the temporal distribution of the hits is a way of representing time/date information 105 in aggregated page hit entry 217 for the individual hit entries 209 that have been aggregated into entry 217. In more general terms, the problem is this: how to incorporate information that consists of sets of values into aggregation tables. What is needed, and what is provided by the invention disclosed herein, is a technique for doing this.

SUMMARY OF THE INVENTION

In one aspect, the technique for incorporating information that consists of sets of values into an aggregation table is a method of aggregating a plurality of entries in table in a database management system into an aggregated entry. The method includes the step of making an aggregated entry that represents a plurality of the table entries and that includes a field whose value is a representation of a set that may have a plurality of members and the step of deriving members of the set from values contained in the plurality of table entries represented by the aggregated entry.

Further refinements of the technique include deleting the plurality of entries which the aggregated entry represents when the aggregated entry has been finished, using a representation of the set which varies with the number of members in the set, representing the set as a character string wherein each member of the set is represented by a sequence of characters and the sequences of characters are separated by a separator character, using a representation of the set which has a size that is constant regardless of the number of members in the set, and in such a representation, representing the set as a string of elements, with there being an element corresponding to each potential member of the set and the presence of a particular member in the set being indicated by a first value of the corresponding element and the member's absence by a second value of the corresponding element. In one application of the technique, the values of the members of the set are time values; in another, they are location values.

In another aspect, the technique for incorporating information that consists of sets of values into an aggregation table is a method of rolling up event information. The method is practiced in a management system for a database management system. The event information is contained in event entries in a table in the database management system and includes a time of occurrence for each event. The method includes the step of making a roll up entry that represents a plurality of the event entries and includes a representation of a set whose members are times of occurrences and the step of deriving the members of the set from the times of occurrences in the plurality of event entries.

Further refinements of the technique include:
  the step of aggregating metric values in the plurality of event entries to produce an aggregated metric value in the roll up entry;
  the step of deleting the plurality of event entries represented by the roll up entry;
  representing the set as a character string wherein each time of occurrence is represented by a sequence of characters and the sequences of characters are separated by a first separator character;
  including the period of time during which the times of occurrences in the entries represented by the roll up entry occurred in the roll up entry;
  a including the number of events represented by the roll up entry in the roll up entry; and
  using digests in the roll up records to represent fields that have the same value in every one of the records represented by the roll up record.

In another aspect, the sets of occurrence times in roll up table entries may be used to detect relationships between events. Where there is a relationship between events, there should also be a relationship between the times of occurrence of the events and the temporal relationship can be detected by comparing sets of occurrence times.

Other objects and advantages will be apparent to those skilled in the arts to which the invention pertains upon perusal of the following Detailed Description and drawing, wherein:

BRIEF DESCRIPTION OF THE DRAWING

FIG. 5 shows an example alert history table that includes entries for various roll up intervals.

Figure 1:
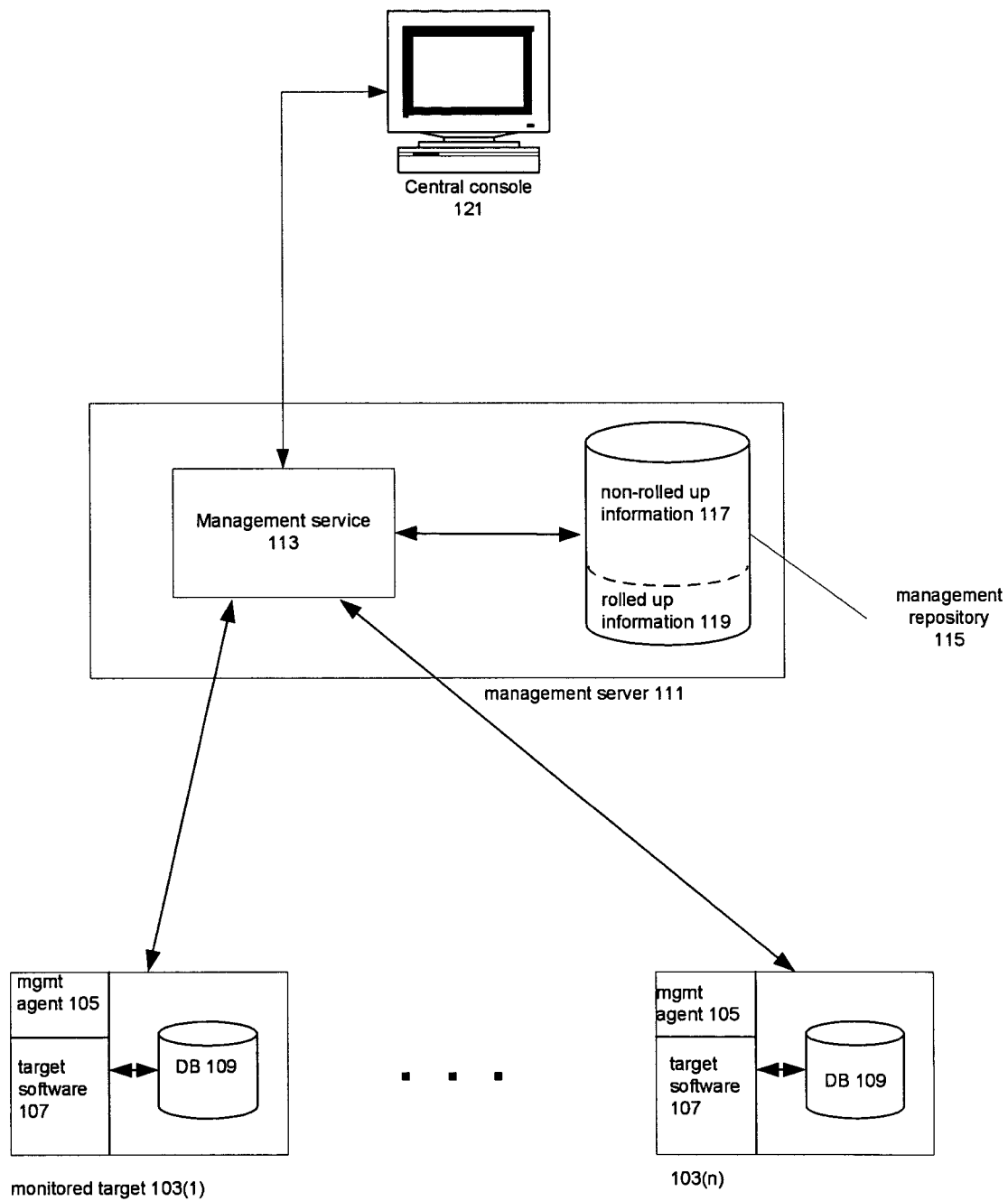
FIG. 1 is an overview of a management system 101 for a data processing system.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

Figure 2:
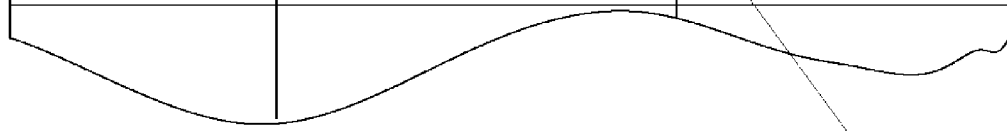
FIG. 2 is an example of a roll up table.
Figure 2:
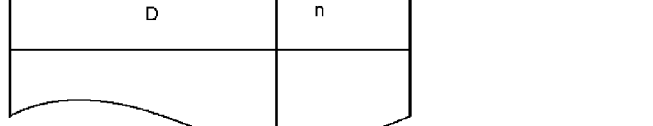

The following Detailed Description will first show how the roll up table of FIG. 2 may be modified to represent a set of values specifying when the hits on the page URL occurred, will then discuss techniques for representing sets of values, and will then describe a table which rolls up event information including when the event occurred, as well as uses for such a table.

Figure 3:
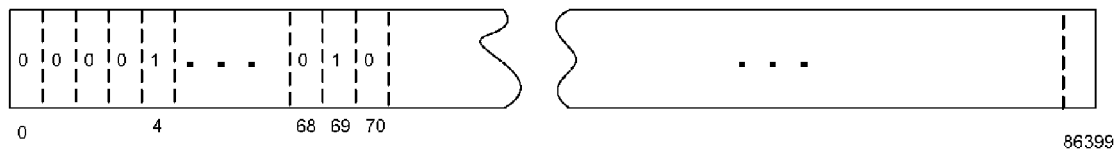
FIG. 3 shows a version of the table of FIG. 2 which has been modified so that the aggregation records represent a set of time values.

Modifying page hit rollup table 211 to specify the times that the hits occurred: FIG. 3

FIG. 3 shows a version 301 of page hit rollup table 211 which has been modified to include a representation of the time/date information contained in field 205 of page hit table 201. The representation makes up column 303 of table 301. The data in fields belonging to column 303 represents the time/date information for all of the records from table 201 that are aggregated into an entry in table 301 as a set of the times at which the hits occurred. Thus, for the record that aggregates the hits on page URL A, the set value is the set {x}; for the record that aggregates the hits on page URL B, the set value is the set {y}. In both cases, the time at which each hit on the record's URL occurred is a member of the set represented by the set value. The set value is made when the records aggregated into the entry in page hit roll up table 301 are aggregated; each time one of the records being aggregated is read, its time/date stamp 205 is made into a member of the set represented by field 303 in the aggregated record. Of course, set values in a rollup record may be further rolled up. For example, the set of times representing hits during a day may be rolled up into a set of times representing hits during a week. Further, the granularity of the set may be reduced in such a rollup. For instance, the weekly rollup may include a set value in which members of the set specify the number of hits per hour for each hour of the week.

There are many ways of representing the set of values; fundamentally, any technique which can be used to represent a list of values can be used to represent a set of values. Moreover, at least some advantage will be gained by any representation of the set of values in which the representation of a particular value is smaller than the representation used for the value in the non-rolled up entry. Which technique is chosen to represent the set of values depends on the storage space/processing time tradeoffs for a particular application and on the sparseness of the information, that is the relationship of the number of values that a set will actually have to the number of values the set can potentially have. For example, if the time of a hit is specified in seconds, there are 86400 seconds in a 24 hour period, so set of hit times 303 in a day rollup table could potentially have that many values. However, if a page is known to typically receive 100 hits a day, the set will typically have only 100 of the possible 86400 values. Such a set is termed herein a sparse set of time values. Conversely, a set in which the number of values in the set approaches the maximum possible is termed a dense set.

Two techniques for representing time values are shown in FIG. 3. At 305 is a comma list set data item and at 307 is a bit set data item. Comma list set data item 305 is a varying-length character string in which the time of each hit is represented by an integer indicating a second. The integers on the list are separated by a separator character, in this case, the comma. Thus, if page URL A has hits at 5 seconds after midnight, 70 seconds after midnight, and so on, the set of hits can be represented by the character string 5,70, and so on for each hit. The string shown at 305 includes a cluster of hits around 8:00 AM; these are represented by the sequence of numbers and commas 28795, 28796, 28,797, 28801, 28805, 28806,. The comma list is well suited for sparse sets; however, each numeral and comma requires 8 bits of storage, and the storage requirements for comma list representations of dense sets become quite large. One way of dealing with this problem is to give the comma list set data item a maximum size which will accommodate a high percentage of the sets and provide an overflow table which stores set members that cannot be accommodated in the comma list set data item. An entry in the overflow table would be accessed by the same key used to access the rollup table entry.

In a bit set data item 307, each possible member of the set is mapped to a single bit in a bit string. Thus, there are 86400 seconds in 24 hours and bit set data item 307 has 86400 bits, numbered 0..86399. When a hit has occurred on a page in one of these seconds, the bit for the second is set to 1; otherwise, the bit has the value 0. Thus, as shown at 307, bits 4 and 69 are set to 1 because hits happened at seconds 5 and 70. Bit set data item 307 is well suited for sets that are at least potentially dense, since the size of bit set data item 307 remains the same regardless of the number of seconds in which hits occur. Another advantage which stems from the fact that the size of bit set data item 307 remains constant is that changes in the number of events do not cause changes in the amount of storage required for the roll up table entry. This property is particularly important with events that may occur in bursts Other representations of the list of time values are of course possible. For example, in a database system that permits nested tables, i.e., the value of a field of a record in a table may itself be a table, the hits could be represented as a table of hits, with an entry for each hit.

Representing other Kinds of Information using Set Values

The time/date information from page hit table 201 is particularly easy to represent in set data items because the information for a given page URL 203 forms a monotonically increasing set of values. However, other kinds of values can be represented in set values as well. For example, the comma list can be used with values that do not increase monotonically or for sets where the values are tuples instead of single numbers. For example, a weekly rollup might represent the hit times with a comma list like this: . . .; day of week, second in day; . . . where the entries in the list are separated by semicolons and the tuple in the entry specifies the day of the week and the second the hit occurred on that day. Comma lists with tuples can similarly be used to represent sets of coordinates in two and three dimensions. Where nested tables are possible, the nested tables could be used in place of the comma lists. Where a set never has two members with the same value and the number of possible values is finite, the set may be mapped to a bit set data item as described above for time values. The bit set data item can of course have more than one dimension; thus, a bit set data item might be used in the weekly rollup to represent a histogram of the hits that occurred during the hours making up the week.

Using Rollups with Set Values for Events and Alerts

As already pointed out, an event is simply something that happens in a system that has significance for the management of the system. A hit on a Web page is one example of an event in database system management system 101. In the context of management service 113, some events are termed alerts, and in the following, the terms "alert" and "event" are used interchangeably. When a series of events is being analyzed, it is often crucial to know when the events in the series occurred; consequently, entries in tables that record occurrences of events generally include a field that indicates the date and time at which the event occurred and it is important that when such event tables are rolled up, the temporal information be preserved. The techniques just described may be used to do this. In the following, an example alert history roll up table that uses the techniques will be described in detail.

The Alert History Information

When an instance of an alert for which the history information is being maintained occurs, the management system stores information about the alert in an entry in a table called the mgmt_severity table. The information in entries of that table has the following form:

|   |   |   |
|---|---|---|
| TargetName | string | [key] |
| TargetType | string | [key] |
| MetricName | string | [key] |
| MetricColumn | string | [key] |
| KeyValue | string | [key] |
| CollectionTimestamp | datetime | [key] |
| AlertState | enum | [key] |
| MetricLabel | string |  |
| ColumnLabel | string |  |
| Message | string |  |

Figure 4:
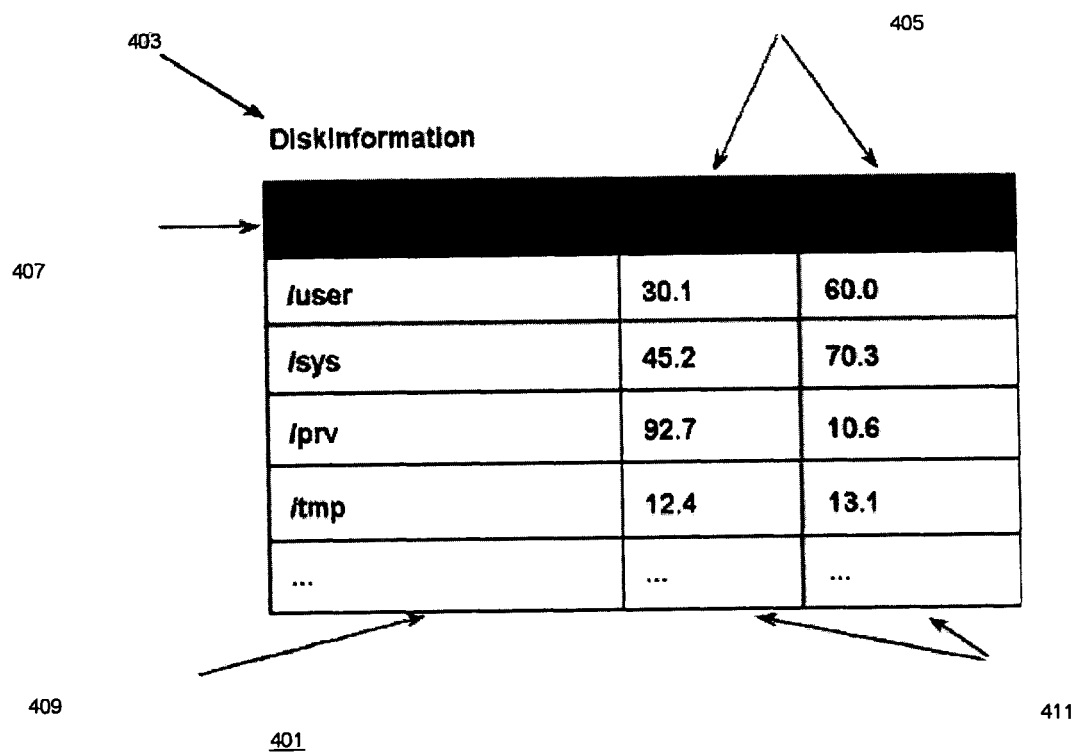
FIG. 4 shows a table containing information upon which an alert may be based.

TargetName is the name of the target 103 from which the alert information was obtained; MetricName is the name of a table for the target which contains the values being monitored; an example of such a table is shown in FIG. 4. MetricColumn is the column 405 in the table 401 specified by MetricName that contains the metric values 411 being rolled up. KeyValue is the value 409 of the entry's key in table 401. CollectionTimestamp is the timestamp for when the information from table 401 was collected. AlertState is the severity of the alert; in a preferred environment, the possible severities are warning and critical. MetricLabel and ColumnLabel are labels used for reports generated from the entry. Message, finally, is a message that explains the alert.

An example of the above fields with the values obtained from table 401 follows:

|   |   |   |
|---|---|---|
| TargetName | string | MySystem |
| TargetType | string | Host |
| MetricName | string | DiskInformation |
| MetricColumn | string | SpaceUsed |
| KeyValue | string | /prv |
| CollectionTimestamp |  | 01-MAY-2003 00:00:05 |
| AlertState |  | Warning |
| MetricLabel |  | Important Disk Information |
| ColumnLabel |  | Total Space Used |
| Message |  | Space Used Threshold exceeded |

The Alert History Table

The alert history table is a single table that contains aggregate records that represent daily and monthly rollups of records for a particular kind of alert from a particular target system that have a particular severity. The size of the records in the alert history is reduced by replacing information that is repeated in every alert history record for a particular type of alert with a digest (for example, a hash value) made from that information. Here, two digests are made: one, termed InstanceId, from the fields TargetName, TargetType, MetricName, MetricColumn, KeyValue, MetricLabel, and ColumnLabel, for which the digest will be the same for every alert of a given type coming from a given target, and another, termed MessageId of the field Message, which will be the same for every alert of the given type. The digests are used not only to represent the information they are made from in the alert history table, but also as indexes to locate the information they are made from in tables in repository 115.

The entries that any alert history table made according to the example will have include the following fields:

|   |   |
|---|---|
| InstanceID | [key] |
| AlertState | [key] |
| AlertCount |  |
| AlertOccurrences |  |
| RollupTime | [key] |
| RollupInterval |  |
| MessageID |  |

AlertState is the same as in the mgmt-severity table. AlertCount is the number of alerts represented by the aggregation entry; AlertOccurrences is the value representing the set of times at which the alerts occurred; RollupTime is the beginning of the time period covered by the roll up. RollupInterval indicates the roll up's window, beginning at RollupTime. In the example, there are two windows: a day window and a month window, In the preferred embodiment, when a monthly rollup is made, the daily rollups that it is based on are removed from the alert history table. As indicated above, the record's key is made from the InstanceID, AlertState, and RollupTime fields, which together give a unique value for every record in the table. Additionally, the records for an alert history table for a given alert may contain aggregated metric values 411 for the rollup period. In this case, the specified metric column is SpaceUsed, so the values being rolled up are the values in that column. The results of the roll up may include the average amount of space being used when the alert was triggered during the roll up period, the minimum amount, and the maximum amount.

FIG. 5 shows how the parts of the record other than the metric values look before and after a monthly rollup. All of the records in the alert history table have the fields set forth above: InstanceId at 503, AlertState at 505, AlertCount at 507, AlertOccurrences, which contains a set of time values, at 509, RollupTime at 511, RollupInterval at 513, and MessageId at 515. At 501 are shown two daily roll up entries 501, 501(i) and (j), as indicated by the values of field 513 in the records. Both records are for warnings (field 503). As indicated by RollupTime field 511, 501(i)'s roll up window was May 1 and 501(j)'s roll up window was May 5. Both roll ups were made after the end of the window. The value of fields 507 shows that there was only one warning on each of those days. Field 509 is a set value 519 that contains a set whose members are the times of each of the alerts that occurred during the roll up period. The set is represented as a comma list, with each time being given as year:day of year:second in the day. Since there were only single alerts on May 1 and May 5, the sets in the entries 501 each include only a single time. An advantage of the format used to represent the time is that it is uniform for all roll up intervals, which makes it easy to apply pattern matching techniques to the format. For example, the pattern 3:121:* would match all warnings that occurred on May 1, 2003.

Entry 517(k) is a monthly roll up entry in the alert history table for the month of May. It is made beginning at midnight on May 1. Entry 517 has the same form as entries 501, except that RollupInterval 513 indicates that the roll up window is one month and set value field 519 contains the times from the daily rollup entries that were rolled up into the monthly roll up entry.

Uses of Alert History Tables with Sets of Values

Alert history tables in which alert counts and times of occurrences of alerts are maintained simplify many different kinds of analysis. The alert count makes it easy to determine the relative frequency of alerts, and thus the most prevalent problems in the system. Moreover, comparison of the frequencies of a given kind of alert in rollups having different roll up times but the same rollup interval will show whether a problem is getting more or less frequent.

Alert counts and alert times can also be used to determine whether one event is dependent on another. As individual alerts are rolled up over time, heuristics can be used to identify strongly related events. For example, in the case where one event always causes a separate event to trigger, the alert count for the triggering event MUST be less than or equal to the dependent event. This property of related events can be used to reduce the search space required to identify the dependent event.

A simple example of this use of alert counts is the following: Among the events that generate alerts are host unavailability and database unavailability. One would expect that when the host is unavailable, the database is also unavailable, and thus that two conditions should hold:
- There should always be at least as many database unavailable alerts as there are host unavailable alerts. (The database may become unavailable for reasons other than the host becoming unavailable.)
- There should always be a database unavailable alert within close temporal proximity of each host unavailable alert.

The first step in determining whether database unavailability is dependent on host unavailability is to look at several pairs of rollup entries for database unavailable alerts and host unavailable alerts where the records in the pair are for the same rollup time and the largest available rollup interval. If the number of database unavailability alerts in each of these pairs is greater than or equal to the number of host unavailability alerts, there is a strong possibility that there is a dependency relationship between host unavailability and database unavailability.

Once the possibility of a dependency relationship has been determined, the existence of the relationship can be confirmed by using the information that is contained in AlertOccurrences 509. If the dependency exists, there should be a temporal relationship between each host unavailable alert and a database unavailable alert. Whether this is in fact the case can be confirmed by selecting a rollup entry for each alert and comparing the sets of values in the AlertOccurrences fields. If it turns out further that there is a database unavailable alert corresponding to each host unavailable alert, but the reverse is not true, then it is clear that database unavailability events are dependent on host unavailability events and not vice-versa.

Queries based on the kind of analysis just described can be used to automatically identify less-obvious dependency relationships. Further, the alert occurrence information in the rollup entries can also be used to determine whether events in one set of events have a termporal relationship to events in another set of events, and this information can be used to identify relationships between events that are less obvious and less strong than the simple dependency of one event on another. Once a temporal relationship between events has been identified, the relationship can be used to filter event entries. For example, if a host unavailable alert always results in a database unavailable alert, the only database unavailable alerts that are really of interest to the DBA are those that are not caused by the unavailability of the host, and when a roll up is made for database unavailable alerts, only those database unavailable alerts that do not happen shortly after a host unavailable alert might be included in the roll up.

Another use of such information about the relationship between events is to reduce the number of messages that are generated during a so-called event storm. For example, if it is known that when a host unavailable event occurs, it causes an event storm, that is, the occurrence of a large number of other events for which management agent 105 generates messages to management service 113, management agent 105 or management service 113 could be set up to provide the host unavailable event message and suppress all of the messages for the events caused by the host unavailable event. Suppressing such extraneous messages reduces the amount of information which must be stored in repository 115 and more importantly, makes it easier for the DBA at central console 121 or the DBA who is analyzing the messages in repository 115 to understand what is really going on.

Conclusion

The foregoing Detailed Description has disclosed to those skilled in the relevant technologies how to make and use aggregated entries in database tables that preserve sets of values obtained from the entries from which the aggregated entries were made and has further disclosed the best mode presently known to the inventors of implementing their invention. It will be immediately apparent to those skilled in the relevant technologies that there are many ways of implementing the techniques of the invention and that the particular characteristics of a given implementation will be strongly determined by the environment in which the implementation is made. For example, when the invention is used to extend an existing roll up system, many details of the implementation will be determined by the existing roll up system. Further, there are many ways in which a set of values can be represented, and the particular representation chosen will be determined by factors such as the properties of the set and the trade off between storage cost and computation cost offered by the system in which the techniques are employed.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of aggregating a plurality of entries in a database management system into an aggregated entry in the database management system, the method comprising:
    making the aggregated entry in a single entry in a single table, by using a processor, the aggregated entry representing the plurality of entries and including a first field whose value is a metric value computed from a set of individual values of a field in the plurality of entries and a second field whose set value is a representation of the set of individual values, the metric value having the property that the individual values from which the metric value was computed cannot be derived from the metric value and the representation of the individual values having the property that the individual values are derivable therefrom, so that the single entry in the single table comprises both the metric value and the set value, wherein at least some of the individual values are lost with the metric value and the individual values are not lost with the set value.

2. The method set forth in claim 1 further comprising the step of:
    deleting the plurality of entries represented by the aggregated entry.

3. The method set forth in claim 1 wherein:
    the second field's value has a size which varies with the number of the individual values.

4. The method set forth in claim 3 wherein:
    the second field's value is a character string, the character string comprising a sequence of characters for each individual member of the set, and separator characters separating each sequence of characters.

5. The method set forth in claim 1 wherein:
the second field's value has a size which is constant regardless of the number of the individual members in the set.

6. The method set forth in claim 5 wherein:
the second field's value comprises a string of elements, the string of elements having an element corresponding to each potential value of the individual values that belong to the set, the presence of a particular individual value in the set being indicated by a first value of the corresponding element and the absence of the particular individual value from the set being indicated by a second value of the corresponding element.

7. The method set forth in claim 1 wherein:
the individual values are time values.

8. The method set forth in claim 1 wherein:
the individual values are location values.

9. The method of aggregating a plurality of entries set forth in claim 1 wherein:
the entries belonging to the plurality indicate occurrences of an event in the database management system, the occurrences being recorded by a management service in the database management system.

10. The method of aggregating a plurality of entries set forth in claim 9 further comprising the step of:
deleting the plurality of entries represented by the aggregated entry.

11. The method of aggregating a plurality of entries set forth in claim 10 wherein:
the individual values indicate times of occurrence of the event.

12. The method of aggregating a plurality of entries set forth in claim 10 wherein:
the individual values indicate places of occurrence of the event.

13. The method of claim 1, in which the aggregated entry is a roll up entry that represents a plurality of event entries and the second field includes the individual values whose members are times of occurrences.

14. The method of claim 13 further comprising:
deriving the members from the times of occurrences in the plurality of event entries.

15. The method of claim 13 further comprising:
counting events represented by the plurality of event entries to obtain a total number of events and setting a representation of the number of events in the first field to the total number of events.

16. The method of claim 13 further comprising:
making a digest from one or more fields of the roll up entry.

17. A non-transitory data storage device, characterized in that:
the non-transitory data storage device contains code which when executed by a processor performs aggregation of a plurality of entries in a database management system into an aggregated entry in the database management system, the code comprising instructions for:
making the aggregated entry in a single entry in a single table, the aggregated entry representing the plurality of entries and including a first field whose value is a metric value computed from a set of individual values of a field in the plurality of entries and a second field whose set value is a representation of the set of individual values, the metric value having the property that the individual values from which the metric value was computed cannot be derived from the metric value and the representation of the individual values having the property that the individual values are derivable therefrom, so that the single entry in the single table comprises both the metric value and the set value, wherein at least some of the individual values are lost with the metric value and the individual values are not lost with the set value.

18. The non-transitory data storage device set forth in claim 17 further characterized in that the code further comprises:
instructions for deleting the plurality of entries represented by the aggregated entry.

19. The non-transitory data storage device set forth in claim 17 further characterized in that:
the second field's value has a size which varies with the number of the individual values.

20. The non-transitory data storage device set forth in claim 19 further characterized in that:
the second field's value is a character string, the character string comprising a sequence of characters for each individual value, and separator characters separating each sequence of characters.

21. The non-transitory data storage device set forth in claim 17 further characterized in that:
the second field's value has a size which is constant regardless of the number of the individual values.

22. The non-transitory data storage device set forth in claim 21 further characterized in that:
the second field's value comprises a string of elements, the string of elements having an element corresponding to each potential value of the individual values that belong to the set, the presence of a particular individual value being indicated by a first value of the corresponding element and the absence of the particular individual value being indicated by a second value of the corresponding element.

23. The non-transitory data storage device set forth in claim 17 further characterized in that:
the individual values are time values.

24. The non-transitory data storage device set forth in claim 17 further characterized in that:
the individual values are location values.

25. The non-transitory data storage device set forth in claim 17 wherein:
the entries belonging to the plurality indicate occurrences of an event in the database management system, the occurrences being recorded by a management service in the database management system.

26. The non-transitory data storage device set forth in claim 25 wherein the code further comprises:
instructions for deleting the plurality of entries represented by the aggregated entry.

27. The non-transitory data storage device set forth in claim 26 wherein:
the individual values indicate times of occurrence of the event.

28. The non-transitory data storage device set forth in claim 26 wherein:
the individual values indicate places of occurrence of the event.

29. The non-transitory data storage device of claim 17, in which the aggregated entry is a roll up entry that represents a plurality of event entries and the second field includes the individual values whose members are times of occurrences.

30. The non-transitory data storage device set forth in claim 29 further characterized in that the code further comprises:
deriving the members from the times of occurrences in the plurality of event entries.

31. The non-transitory data storage device set forth in claim 29 further characterized in that the code further comprises:
counting events represented by the plurality of event entries to obtain a total number of events and setting a representation of the number of events in the first field to the total number of events.

32. The non-transitory data storage device set forth in claim 29 further characterized in that the code further comprises: making a digest from one or more fields of the roll up entry.

33. A computer system for aggregating a plurality of entries in a database management system into an aggregated entry in the database management system, the system comprising:
a processor for making the aggregated entry in a single entry in a single table, the aggregated entry representing the plurality of entries and including a first field whose value is a metric value computed from a set of individual values of a field in the plurality of entries and a second field whose set value is a representation of the set of individual values, the metric value having the property that the individual values from which the metric value was computed cannot be derived from the metric value and the representation of the individual values having the property that the individual values are derivable therefrom, so that the single entry in the single table comprises both the metric value and the set value, wherein at least some of the individual values are lost with the metric value and the individual values are not lost with the set value.

34. The system set forth in claim 33, wherein the processor further performs the act of:
deleting the plurality of entries represented by the aggregated entry.

35. The system set forth in claim 33, wherein:
the second field's value has a size which varies with the number of the individual values.

36. The system set forth in claim 35, wherein:
the second field's value is a character string, the character string comprising a sequence of characters for each individual member of the set, and separator characters separating each sequence of characters.

37. The system set forth in claim 33, wherein:
the second field's value has a size which is constant regardless of the number of the individual members in the set.

38. The system set forth in claim 37, wherein:
the second field's value comprises a string of elements, the string of elements having an element corresponding to each potential value of the individual values that belong to the set, the presence of a particular individual value in the set being indicated by a first value of the corresponding element and the absence of the particular individual value from the set being indicated by a second value of the corresponding element.

39. The system set forth in claim 33, wherein:
the individual values are time values.

40. The system set forth in claim 33, wherein:
the individual values are location values.

41. The system of aggregating a plurality of entries set forth in claim 33, wherein:
the entries belonging to the plurality indicate occurrences of an event in the database management system, the occurrences being recorded by a management service in the database management system.

42. The system of aggregating a plurality of entries set forth in claim 41, wherein the processor further performs the act of:
deleting the plurality of entries represented by the aggregated entry.

43. The system of aggregating a plurality of entries set forth in claim 42, wherein:
the individual values indicate times of occurrence of the event.

44. The system of aggregating a plurality of entries set forth in claim 42, wherein:
the individual values indicate places of occurrence of the event.

45. The system of claim 33, in which the aggregated entry is a roll up entry that represents a plurality of event entries and the second field includes the individual values whose members are times of occurrences.

46. The system of claim 45, in which the processor derives the members from the times of occurrences in the plurality of event entries.

47. The system of claim 45, in which the processor counts events represented by the plurality of event entries to obtain a total number of events and setting a representation of the number of events in the first field to the total number of events.

48. The system of claim 45, in which the processor makes a digest from one or more fields of the roll up entry.

* * * * *